Patented Dec. 7, 1937

2,101,066

UNITED STATES PATENT OFFICE 2,101,066

NITROCELLULOSE EMULSION

Cleveland B. Hollabaugh, Wilmington, Del., assignor to Hercules Powder Company, Wilmington, Del., a corporation of Delaware No Drawing. Application February 2, 1937, Serial No. 123,725

12 Claims. (Cl. 134—79)

This invention relates to an improvement in nitrocellulose emulsions and, more particularly, to nitrocellulose emulsions more especially adapted for the formation of a continuous, non-porous, adherent, substantially non-penetrating film on the surface of porous, absorbent material. Further, this invention relates to an improvement in method for the formation of a continuous, non-porous, adherent substantially non-penetrating film on the surface of porous, absorbent materials and to the product thereof.

Heretofore it has not been practical to coat with nitrocellulose porous, absorbent materials, such as papers, cardboards, fabrics, plaster, cement, concrete, and the like, with avoidance of penetration of the nitrocellulose into the body of the material.

Heretofore various porous, absorbent materials have been coated with nitrocellulose lacquers comprising a solution of nitrocellulose with or without non-volatile modifying ingredients. However, such procedure, while providing a surface coating of nitrocellulose, is not capable of providing a non-penetrating surface film of nitrocellulose, since the lacquer is, to a greater or less degree, depending upon the porosity of the material coated, absorbed into the body of the material.

Heretofore attempts have been made to provide a non-penetrating coating on porous, absorbent materials through the use of nitrocellulose solutions or lacquers of relatively high viscosity, effecting the coating by the use of an ordinary coating machine or by a knife-coating machine. By such procedure, however, it is impossible to form a continuous film of minimum thickness and weight, since excess solution cannot be removed from the surface of the material to leave a continuous film of minimum thickness, due to the heavy body or high viscosity of the nitrocellulose solution necessarily used.

It will be appreciated that even the comparatively heavy viscous nitrocellulose solutions such as were heretofore applied to porous, absorbent surfaces by the use of a doctor blade or roll are absorbed by the porous support due to its absorbent nature so that an uneven lacquer surface results after drying. Porous particles of the porous support project up through the lacquer surface and exert a wick action upon any liquid applied to the surface causing such liquid to penetrate through the lacquer surface and into the porous support. If a heavy enough lacquer coating were to be applied to cause such coating to build up above the height of the projecting, porous particles, the weight of lacquer solids so applied would become so great as to be uneconomical.

Now in accordance with this invention, it has been found that a continuous, non-porous, adherent, substantially non-penetrating film can be formed on porous, absorbent materials, irrespective of their porosity, through the medium of a nitrocellulose emulsion comprising a viscous, substantially water-immiscible solution of nitrocellulose dispersed in internal phase in an aqueous solution of an emulsifying agent, the emulsion being stabilized by mechanical treatment, as by treatment with a colloid mill or homogenizer, provided the viscosity of the dispersed nitrocellulose solution is such with respect to a given porous, absorbent material to be coated that upon drying on the surface of the porous, absorbent material a continuous film of nitrocellulose will be deposited upon the surface of the material without substantial penetration into the body thereof.

In accordance with this invention, it has been found, surprisingly, that through the medium of nitrocellulose emulsions particularly characterized, a thin, minimum dry weight continuous, non-porous, adherent, substantially non-penetrating nitrocellulose film can be provided economically and efficiently on the surface of porous, absorbent materials without the necessity for preliminary sizing of the material to satisfy its porosity or absorbency and, surprisingly, such has been found not only possible, but highly efficient and economical even though the particle size of the emulsified nitrocellulose solution be less than the pore size of the porous material, and even though the viscosity of the emulsion be very low so that one would expect that on application of the emulsion to the surface of a porous, absorbent material the emulsion would rapidly penetrate the body of the material.

The method in accordance with this invention will comprise the application to the surface of a porous, absorbent material, as by brushing, spraying, roll coating, etc., of a nitrocellulose emulsion comprising as the disperse phase a nitrocellulose solution having a high viscosity as compared to that of lacquers heretofore used for the application of thin coatings and comprising essentially a nitrocellulose solution the viscosity of which is such with respect to a given porous, absorbent material to be coated, that on drying on the surface of the porous, absorbent material, a continuous, non-porous, adherent film will be deposited on the surface without substantial penetration of the body of the porous, absorbent material.

The product in accordance with this invention will comprise, in combination, a porous, absorbent material, as a base, in combination with a dry, continuous, non-porous adherent, substantially non-penetrating film of nitrocellulose superimposed directly on a surface of said material. More specifically, the product will be characterized by the fact that the continuous, non-porous, adherent, substantially non-penetrating film will be formed by the application, in accordance with the method of this invention, of a nitrocellulose emulsion in accordance with this invention, upon a surface of a porous, absorbent material.

In the product, preferably, the weight of the dry film will be about 30 pounds per 3,000 square feet or less of surface of the porous, absorbent material or base. Variously, where the porous, absorbent material or base has a relatively smooth, uniform porous surface, the dry weight of the film may be within the range of about 3 pounds to about 20 pounds per 3,000 square feet of surface of the porous, absorbent material or base.

Much to my surprise, I have found that, even though the particle size of the disperse phase of the emulsion be less than the pore size of the porous material, and even though the viscosity of the emulsion be very low, so that one would expect rapid penetration of the porous support by the emulsion, substantially no penetration of the porous support occurs, provided that the dispersed nitrocellulose solution be of sufficiently high viscosity as compared with ordinary lacquer solution. In other words, the viscosity, and not the particle size of the dispersed phase of the emulsion, is the determining factor of penetration of the porous support of the emulsion.

To obtain the best results in the application of my nitrocellulose emulsions to porous surfaces, it is desirable to correlate the porosity or absorbency of the porous support with the viscosity of the disperse phase of the nitrocellulose emulsion. For example, with a highly porous support, I prefer to use a nitrocellulose emulsion which, while fluid and free-running as an emulsion, contains as the disperse phase a nitrocellulose solution of relatively high viscosity, to the end that, after most of the aqueous phase of the emulsion has been absorbed by the porous support, or evaporated, or otherwise removed, the disperse phase coalesces and deposits as a highly viscous coating on the very surface of the support and does not penetrate thereinto, and such disperse phase only then solidifies by gradual elimination of the solvents in such disperse phase.

I am unable to explain satisfactorily the action or internal mechanism involved in the application of lacquers as emulsions to porous, absorbent surfaces. On first consideration it would be thought that there would be a close relation of the pore size of the porous, absorbent surface to the particle size of the emulsion. Such, however, I have found not to be the case. I am inclined to believe that the emulsion-breaking action of electrolytes, which are to a certain extent present in all porous, absorbent supports, has a considerable bearing on the coating action. I am inclined to believe also that what might be called a "bridging action" of the viscous, slowly-mobile layer of nitrocellulose solution first separating on the surface has a bearing on its lack of flow down into the pores of the porous, absorbent support.

At any rate, the results described are surprising and unexpected, and so far are obscure to me as to the mechanism thereof.

Regardless of what may be the intrinsic internal mechanism thereof, the nitrocellulose emulsions according to this invention break on the surface, and form a continuous, thin film of highly viscous nitrocellulose solution. The viscosity of such solution, in order not to penetrate into the pores of the support, must be adapted to the type of support. If the pore size of the support belarge, I use an extremely viscous disperse phase of nitrocellulose solution, in order to "bridge over" such pores while the porous support is still moist. If the pores be minute I may use a less viscous disperse phase of the nitrocellulose solution, because less "bridge over" effect is necessary in this case.

I have been unable to determine any numerical relation between pore size of the porous support and viscosity of the internal phase of the nitrocellulose emulsion.

More specifically, though not essentially in all cases, the nitrocellulose emulsions in accordance with this invention and adaptable for use in carrying out the method in accordance with this invention for production of the product thereof, will be characterized variously by a concentration of nitrocellulose in the nitrocellulose solution of 10%–50%. Again, the nitrocellulose solution will be emulsified in disperse phase in the aqueous solution of an emulsifying agent on the ratio 1.75:1 to 4:1, or again, still more specifically, within the ratio of 2:1–3:1, with a preference for a ratio of 2.5:1. While the volatile portion of the nitrocellulose solution, as the solvent or solvent mixture, may comprise any suitable nitrocellulose solvent or solvent mixture such as is used in the lacquer art, the volatile portion of the nitrocellulose solution will desirably, though not essentially, comprise a composition; i. e. solvent or solvent mixture including a diluent, more than half of which will boil at less than 140° C. or in certain instances such that more than half will boil within about the range 50° C.–130° C.

While the nitrocellulose component of the nitrocellulose solution comprised in emulsions in accordance with this invention may be of any desired viscosity characteristic, the particular viscosity of the nitrocellulose being determined by the particular viscosity and total solids content desired for the solution in any given emulsion, it will be preferable that the nitrocellulose have a viscosity within about the range .0125 second (Hercules) to about 400 seconds (Hercules). Again, and more specifically, the nitrocellulose may have a viscosity within the narrower range of 0.5 second (Hercules) to 100 seconds (Hercules).

The particular viscosity of the nitrocellulose solution comprised in emulsions in accordance with this invention may be widely varied, it being essential only that the viscosity of the nitrocellulose solution be adjusted with respect to the porosity of a given porous, absorbent material by forming the nitrocellulose solution with nitrocellulose of a viscosity characteristic and in amount, so that upon drying on the surface of the porous, absorbent material, a continuous, adherent, non-porous film will be deposited upon the surface of the material without substantial penetration into the body thereof. The viscosity of the nitrocellulose solution will, however, desirably be within about the range 3–27,000 seconds or, more desirably, within about the range 150–10,000 seconds, with preference for general use throughout a substantial range of porosity of various materials of about 1,000 to 2,000 seconds, as determined by the A. S. T. M. standard method; i. e. the time required for a 1/16" steel ball to fall through 10 inches of the solution contained in a one inch diameter tube at 25° C.

As has been indicated, the solvent or solvent mixture comprised in the nitrocellulose solution component of emulsions in accordance with this invention and adaptable for use in carrying out the method in accordance with this invention for production of the product thereof, may comprise any of the well known lacquer solvents and solvent mixtures. More specifically, for example, the solvent may comprise secondary hexyl acetate, butyl acetate, butyl propionate, amyl acetate, butyl butyrate, heptyl acetate, etc., or mixtures thereof. Where it is desirable to use a solvent mixture, any one of the above solvents or mixtures thereof may be used in admixture with a diluent, such as, for example, xylol, high flash solvent naphtha, petroleum naphtha, toluol, butyl alcohol, amyl alcohol, or mixtures thereof.

Where the solvent or solvent mixture component of the nitrocellulose solution is desired to be of such composition that more than half of the solvent or solvent mixture will boil below 140° C. or within about the range 50° C.–130° C., for example, any of the solvents or mixtures of the solvents and diluents listed in the following table, and within the maximum amounts given in the following table, may be used:

| No. | Approximate boiling point ° C. | Name | Maximum percent to be used in solvent mixture |
|---|---|---|---|
| 1 | 35 | Ether | 75 |
| 2 | 56 | Acetone | 25 |
| 3 | 50+ | Mineral spirits | 75 |
| 4 | 60 | Methyl acetate | 50 |
| 5 | 63 | Methanol | 25 |
| 6 | 75 | Ethyl acetate | 100 |
| 7 | 76 | Carbon tetrachloride | 50 |
| 8 | 78 | Ethanol | 25 |
| 9 | 80 | Benzol | 100 |
| 10 | 80 | Ethyl methyl ketone ethyl acetone | 25 |
| 11 | 80 | Isopropyl alcohol | 75 |
| 12 | 85 | Ethylene chloride | 75 |
| 13 | 90 | Isopropyl acetate | 100 |
| 14 | 98 | Ethyl propionate | 100 |
| 15 | 100 | Diethyl carbonate | 100 |
| 16 | 101 | Diethylene oxide | 100 |
| 17 | 102 | Butanol | 75 |
| 18 | 110 | Toluol | 100 |
| 19 | 113 | Butyl acetate | 100 |
| 20 | 115 | Amyl alcohol | 75 |
| 21 | 118 | Methyl isobutyl ketone | 100 |
| 22 | 120 | Methyl cellosolve | 25 |
| 23 | 125 | Epiethylin glycidylethyl ether | 100 |
| 24 | 126 | Pentasol | 100 |
| 25 | 130 | Isoamyl alcohol isobutyl carbinol primary | 25 |
| 26 | 130 | Cellosolve | 25 |
| 27 | 135 | Ethyl benzene | 75 |
| 28 | 135 | Butyl ethyl carbonate | 100 |
| 29 | 135 | Pent-acetate | 100 |
| 30 | 139 | Xylol | 75 |
| 31 | 139 | Butyl propionate | 100 |

It will be noted that the maximum amounts of certain of the solvents and diluents given above, as acetone, methanol and ethanol, which are water-miscible, are low, since it is essential that the nitrocellulose solution as a whole be substantially water-immiscible. Again, it will be appreciated that the maximum amounts of the various diluents are based on the use of a good nitrocellulose solvent and it will be obvious that with use of the less active solvents the maximum amount of diluent which may be used will be lowered. Where a large quantity of a non-volatile solvent plasticizer is included in the solution, it will in certain cases be possible to formulate the solution with a diluent or diluents and without the use of any volatile solvent.

Nitrocellulose emulsions in accordance with this invention and adaptable for carrying out the method in accordance with this invention for production of the product contemplated thereby may include in the aqueous phase any suitable emulsifying agent so long as it be soluble in water and inert to the nitrocellulose as well as to such other ingredients as may be included in the nitrocellulose solution and to the porous, absorbent base to a surface of which the emulsion is to be applied. Thus, for example, the emulsifying agent may comprise a soap, as sodium oleate, ammonium linoleate, sodium resinate, ammonium oleate, etc., a sulphonated polymerized terpene, gelatin, a sulphonated oil, as sulphonated castor oil, etc., sodium, potassium, lithium, or the like, salts of the higher aliphatic sulphates, preferably containing eight or more carbon atoms, such as, for example, sodium oleyl sulphate, sodium lauryl sulphate, sodium stearyl sulphate, sodium myristyl sulphate, sodium cetyl sulphate, etc., a sodium salt of butyl or isopropyl naphthalene sulphonic acid, as sodium butyl naphthalene sulphonate, etc., oleo glycerol sulphate, methyl cellulose, the sodium salt of sulphuric ester of glycerin-mono-dodecyl ether, the sodium salt of dodecylmercapto acetic acid, etc., or other compounds equivalent therefor, or mixtures thereof.

The emulsifying agent may be used in widely varying amount, depending upon the particular emulsifying agent used, thus, for example, in amount within about the range 0.1%–5% by weight of the water. By way of example, 2% of sodium resinate or 0.75% of sodium lauryl sulphate in the water phase will be satisfactory.

The nitrocellulose solution may include any of the well known available modifiers for nitrocellulose, such, for example, as have heretofore commonly been used in nitrocellulose lacquers such, for example, as plasticizers, gums, resins, and the like, and such may be used in widely varying amounts, depending upon the characteristics desired for the ultimate film. Thus, by way of example, the nitrocellulose solution may contain a gum or resin, as, for example, dammar gum, ester gum, ethyl abietate, modified rosin, alkyd resins, terpinene maleate, etc.; a plasticizer, as, for example, dibutyl phthalate, tricresyl phosphate, castor oil, triethyl citrate, phthalyl glycollates, etc. The nitrocellulose solution where desired may also include pigments and dyes, bronzes, crystallizing agents, cyclic hydrocarbons, waxes, oils, etc. commonly used in nitrocellulose lacquers and enamels. Where pigments and dyes are used such will desirably be substantially free of water-soluble electrolytes.

In the preparation of nitrocellulose emulsions in accordance with this invention and adapted for carrying out the method in accordance with this invention for production of the product thereof, the nitrocellulose solution will first be prepared or formed with adjustment of the viscosity of the solution with respect to the porosity of a porous, absorbent material to be surface coated therewith. The solution will be made up in any well known manner and the indicated adjustment of the viscosity of the solution will be made by the selection of nitrocellulose of a suitable viscosity characteristic and use of an amount of nitrocellulose with respect to the volatile content of the solution, with consideration for any other ingredients, as a modifying agent; i. e. for the total solids content of the solution. The nitrocellulose solution having been made up, it will be admixed with an aqueous solution of an emulsifying agent, the admixing involving sufficient agitation to form an emulsion and the emulsion will then be stabilized by mechanical treatment, as, for example, by treatment in a colloid mill or homogenizer.

As more specifically illustrative of emulsions in accordance with this invention adapted for carrying out the method of this invention for the production of the product thereof, for example, suitable nitrocellulose emulsions may be made up on any one of the following formulae:

*Formula No. 1*

| | Parts |
|---|---|
| Nitrocellulose (any desired viscosity) | 25 |
| Castor oil | 33 |
| Butyl alcohol | 10 |
| Butyl acetate | 14 |
| Toluol | 14 |

Using ½ second (Hercules) nitrocellulose, solution viscosity is 50 seconds (A. S. T. M.).

*Formula No. 2*

| | Parts |
|---|---|
| Nitrocellulose | 20 |
| Castor oil | 30 |
| Butyl alcohol | 9 |
| Butyl acetate | 21 |
| Toluol | 20 |

Using ½ second (Hercules) nitrocellulose, solution viscosity is 60 seconds (A. S. T. M.), using 1 second (Hercules) nitrocellulose, solution viscosity is 250 seconds (A. S. T. M.). Using 5 second (Hercules) nitrocellulose, solution viscosity is 3000 seconds (A. S. T. M.). Using 18 seconds (Hercules) nitrocellulose, solution viscosity is 10,000 seconds (A. S. T. M.).

*Formula No. 3*

| | Parts |
|---|---|
| Nitrocellulose | 10 |
| Castor oil | 15 |
| Butyl alcohol | 4 |
| Butyl acetate | 36 |
| Toluol | 35 |

Using ½ second (Hercules) nitrocellulose, solution viscosity is 2 seconds (A. S. T. M.); 5 second nitrocellulose, 20 seconds (A. S. T. M.); 18 second nitrocellulose, 100 seconds (A. S. T. M.); 110 second nitrocellulose, 250 seconds (A. S. T. M.); 200 second nitrocellulose, 1,000 seconds (A. S. T. M.); 400 second nitrocellulose, 10,000 seconds (A. S. T. M.).

*Formula No. 4*

| | Parts |
|---|---|
| 1000 second (Hercules) nitrocellulose | 5 |
| Castor oil | 7 |
| Butyl acetate | 43 |
| Butyl alcohol | 2 |
| Toluol | 43 |

Solution viscosity (A. S. T. M.), 30 seconds.

*Formula No. 5*

| | Parts |
|---|---|
| ½ second (Hercules) nitrocellulose | 38.5 |
| Triethyl citrate | 23 |
| Butyl acetate | 11 |
| Butyl alcohol | 16.5 |
| Toluol | 11 |

Solution viscosity (A. S. T. M.), 1800 seconds.

*Formula No. 6*

| | Parts |
|---|---|
| ½ second (Hercules) nitrocellulose | 35 |
| Triethyl citrate | 21 |
| Butyl alcohol | 14 |
| Butyl acetate | 16 |
| Toluol | 14 |

Solution viscosity (A. S. T. M.), 310 seconds.

*Formula No. 7*

| | Parts |
|---|---|
| Nitrocellulose | 20 |
| Castor oil | 30 |
| Ethyl alcohol | 9 |
| Butyl acetate | 21 |
| Toluol | 20 |

Using ½ second (Hercules) nitrocellulose—solution viscosity (A. S. T. M. supra) is 60 seconds.

Using 1 second (Hercules) nitrocellulose—solution viscosity (A. S. T. M. supra) is 250 seconds.

Using 5 second (Hercules) nitrocellulose—solution viscosity (A. S. T. M. supra) is 3,000 seconds.

Using 18 second (Hercules) nitrocellulose—solution viscosity (A. S. T. M. supra) is 10,000 seconds.

Nitrocellulose solutions made up in accordance with any one of the above formulae may be readily emulsified in disperse phase in water by admixing, with agitation, for example, 2.5 parts of nitrocellulose solution to 1 part of water containing, for example, 0.75% of sodium lauryl sulphate in solution, and homogenizing the mixture, for example, by passing through a colloid mill.

Where any given emulsion, on production, is too viscous, its viscosity may be lowered by addition of small quantities of water, say 2%–7% of the total volume of the emulsion. On the other hand, if the viscosity of the completed emulsion is too low, its viscosity may be raised by addition to the finished emulsion of a small quantity of a water-immiscible liquid, as, for example, butyl acetate, hexyl acetate, toluol, or the like, or of a hydrophilic material such as gelatine, glycol boriborate, methyl cellulose, a water-soluble gum, or the like, in small quantity. It will be understood that the precise viscosity for the finished emulsion will depend upon the desired mode of application and upon the conditions under which application is to be made.

It will be understood that a wide variety of solvents and/or solvent mixtures may be used in place of those given in the above formulae, it being noted that while the solvent or mixtures included in the above formulae are of such composition that more than half will boil below about 140° C., satisfactory nitrocellulose emulsions in accordance with this invention for carrying out the method thereof for production of the product thereof are readily made up with various solvents and/or solvent mixtures that boil within various temperature ranges in varying proportion.

With more particular reference to the practical adaptation of the method in accordance with this invention, emulsions in accordance with this invention and having a nitrocellulose solution phase or component of viscosity suitably adjusted with respect to the porosity of porous, absorbent materials or bases to be coated, will be applied in any desired manner, as, for example, by spraying or brushing. On application of the emulsion, it will break, either from physical action, as the absorbence of the water phase by the absorbent material, or from the solution in the water phase of an electrolyte carried by the material, or both with resultant coalescence of the disperse phase on the surface of the material with the formation of a continuous, non-porous, adherent film on the surface, on evaporation of the solvent. Due to the fact that the water of the emulsion is absorbed by the porous material, the water does not have to be evaporated with the solvent, and consequently, despite the low boiling point of the solvent or solvent mixture and the higher concentration of solids, the coalesced solution will dry to a clear film where no pigment is present and in any event to a film free from precipitated nitrocellulose.

As has been indicated, it has not been found possible to determine any numerical relation between the pore size or porosity or absorbency of porous materials and viscosity of the internal phase or nitrocellulose solution component of nitrocellulose emulsions in accordance with this invention and adapted for the carrying out of the method thereof. However, the following examples of nitrocellulose emulsions in accordance with this invention and adapted for the carrying out of the method thereof for the production of the product thereof, more particularly, with respect to the viscosity of the internal phase or nitrocellulose solution component with respect to particular porous, absorbent materials over a wide range of porosity or absorbency, will enable those skilled in the art with ease to economically and efficiently prepare nitrocellulose emulsions in accordance with this invention and for the carrying out of the method thereof for the coating of any porous, absorbent material or base desired to be coated.

Thus, by way of example, with a highly porous, absorbent surface of blotting paper, it has been found that, with an emulsion containing in the disperse phase a nitrocellulose solution of a viscosity of 10,000 seconds (A. S. T. M.), a continuous, non-porous, adherent, substantially non-penetrating coating of nitrocellulose can be formed on the surface when as little as 14 lbs. per 3,000 square feet of dry substance is deposited.

Similarly, with a jute cardboard, it has been found that with an emulsion containing in the disperse phase a nitrocellulose solution of a viscosity of 1,000 seconds (A. S. T. M.) a continuous, non-porous, adherent, substantially non-penetrating coating of nitrocellulose can be formed on the surface when as little as 11 lbs. per 3,000 square feet of dry substance is deposited.

Similarly, with Lion jute tag cardboard, a substantially less porous cardboard, it has been found that with a disperse nitrocellulose phase of a viscosity of 150 seconds (A. S. T. M.) a continuous, non-porous, adherent, substantially non-penetrating coating of nitrocellulose can be formed on the surface thereof with as little as 7 lbs. per 3,000 square feet of dry substance deposited.

Similarly, with Champion Garamond text paper, a relatively porous paper, it has been found that with a nitrocellulose emulsion containing in the disperse phase a nitrocellulose solution of a viscosity of 250 seconds (A. S. T. M.), a continuous, non-porous, adherent, non-penetrating coating of nitrocellulose can be formed on the surface when as little as 10 lbs. per 3,000 square feet of dry substance is deposited.

Similarly, with plain bond paper, with an emulsion having a disperse phase of 20 seconds (A. S. T. M.) viscosity nitrocellulose solution, a continuous, non-porous, adherent, substantially non-penetrating coating of nitrocellulose can be formed on the surface with 7 lbs. of dry substance per 3,000 square feet of surface.

Similarly, with Fernside ledger paper, a less porous paper, with an emulsion having a disperse phase of a nitrocellulose solution of a viscosity of 10 seconds (A. S. T. M.), a continuous, non-porous, adherent, substantially non-penetrating coating of nitrocellulose can be formed on the surface with as little as 5 lbs. per 3,000 square feet of dry substance.

As a result of this invention, the provision of thin, economic, highly efficient coatings of nitrocellulose upon the surface of porous, absorbent material is enabled with ease and efficiency, without presizing of the porous, absorbent material and without the uneconomic application of any excess amount of nitrocellulose or loss of nitrocellulose through absorption thereof by the porous, absorbent material.

Further, in accordance with this invention, porous, absorbent materials coated with a continuous, thin, non-porous, adherent, substantially non-penetrating film of nitrocellulose and adaptable for use widely in the commercial arts are provided.

This application is a continuation in part of applications filed by me Serial No. 11,685, filed March 18, 1935, and Serial No. 12,725, filed March 23, 1935, which are continuations in part of application filed by me Serial No. 703,833, filed December 23, 1933.

What I claim and desire to protect by Letters Patent is:

1. A nitrocellulose emulsion for the formation of a continuous, non-porous, adherent film on the surface of porous, absorbent material comprising a viscous, substantially water-immiscible solution of nitrocellulose emulsified in disperse phase in an aqueous solution of an emulsifying agent, the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

2. A nitrocellulose emulsion for the formation of a continuous, non-porous, adherent film on the surface of porous, absorbent material comprising a viscous, substantially water-immiscible solution of nitrocellulose having a viscosity of from about 3 seconds (A. S. T. M.) to about 27,000 seconds (A. S. T. M.), emulsified in disperse phase in an aqueous solution of an emulsifying agent on the ratio of 1.75:1 to 4:1, the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

3. A nitrocellulose emulsion for the formation of a continuous, non-porous film on the surface of a porous material, comprising a viscous, substantially water-immiscible solution of nitrocellulose, having a concentration of nitrocellulose of 10%-50%, and more than half of the volatile portion of which will boil at less than 140° C., emulsified in disperse phase in an aqueous solution of an emulsifying agent on the ratio of 1.75:1 to 4:1, the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

4. A nitrocellulose emulsion for the formation of a continuous, non-porous film on the surface of porous material comprising a viscous, substantially water-immiscible solution of nitrocellulose having a viscosity of from about 3 seconds (A. S. T. M.) to about 27,000 seconds (A. S. T. M.), and more than half of the volatile portion of which will boil at less than 140° C. emulsified in disperse phase in an aqueous solution of an emulsifying agent, the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

5. A nitrocellulose emulsion for the formation of a continuous, non-porous, non-penetrating film on the surface of porous material comprising a viscous, substantially water-immiscible solution of nitrocellulose having a viscosity characteristic of from 0.125 second (Hercules) to about 400 seconds (Hercules) more than half of the volatile portion of which will boil at less than 140° C. emulsified in disperse phase in an aqueous solution of an emulsifying agent, the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

6. A nitrocellulose emulsion for the formation of a continuous, non-porous film on the surface of porous material comprising a viscous, substantially water-immiscible solution of nitrocellulose more than half of the volatile portion of which will boil at less than 140° C. and having a concentration of nitrocellulose of from about 10% to about 50% emulsified in disperse phase in an aqueous solution of an emulsifying agent, the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

7. A nitrocellulose emulsion for the formation of a continuous, non-porous, non-penetrating film on the surface of porous material comprising a viscous, substantially water-immiscible solution of nitrocellulose more than half of the volatile portion of which will boil at less than 140° C. emulsified in disperse phase in an aqueous solution of an emulsifying agent on a ratio of from about 1.75:1 to about 4:1, the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

8. A nitrocellulose emulsion for the formation of a continuous, non-porous, non-penetrating film on the surface of porous material comprising a viscous, substantially water-immiscible solution of nitrocellulose more than half of the volatile portion of which will boil at less than 140° C. and having a concentration of nitrocellulose of from about 10% to about 50%, emulsified in disperse phase in an aqueous solution of an emulsifying agent, on a ratio of from about 1.75:1 to about 4:1, the viscosity of the nitrocellulose solution in disperse phase being from about 3 seconds (A. S. T. M.) to about 27,000 seconds (A. S. T. M.), the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

9. A nitrocellulose emulsion for the formation of a continuous, non-porous, non-penetrating film on the surface of porous material comprising a substantially water-immiscible solution of nitrocellulose having a viscosity within about the range 150-10,000 seconds and more than half of the volatile portion of which will boil within about the range 50-130° C. emulsified in disperse phase in an aqueous solution of an emulsifying agent on the ratio of 1.75:1 to 4:1, the viscosity of the emulsified nitrocellulose solution being adjusted with respect to a given porous material by forming the solution with nitrocellulose of a viscosity characteristic and in amount with relation to the volatile content of the solution so that upon drying on the surface of the porous material a continuous film of nitrocellulose will be deposited upon the surface of the material without substantial penetration into the body thereof and the emulsion being stabilized by mechanical treatment, as by treatment with a colloid mill or homogenizer.

10. Method for the formation of a continuous, adherent, non-porous, substantially non-penetrating nitrocellulose film on the surface of a porous, absorbent material, which comprises applying an emulsion as defined in claim 1 as a coating to a surface of a porous, absorbent material and drying the emulsion.

11. Method for the formation of a continuous, adherent, non-porous, substantially non-penetrating nitrocellulose film on the surface of a porous, absorbent material, which comprises applying an emulsion as defined in claim 2 as a coating to a surface of a porous, absorbent material and drying the emulsion.

12. In combination, a porous, absorbent material and a continuous, adherent, non-porous, substantially non-penetrating film comprising nitrocellulose superimposed directly on the surface of said material, said film being formed by the application to a surface of the porous, absorbent material of an emulsion as defined in claim 1, and drying the emulsion.

CLEVELAND B. HOLLABAUGH.